July 6, 1965 P. C. NETZEL ETAL 3,193,633
RACKING MECHANISM INCLUDING A DIFFERENTIAL PULLEY SYSTEM
Filed July 2, 1962 5 Sheets-Sheet 3
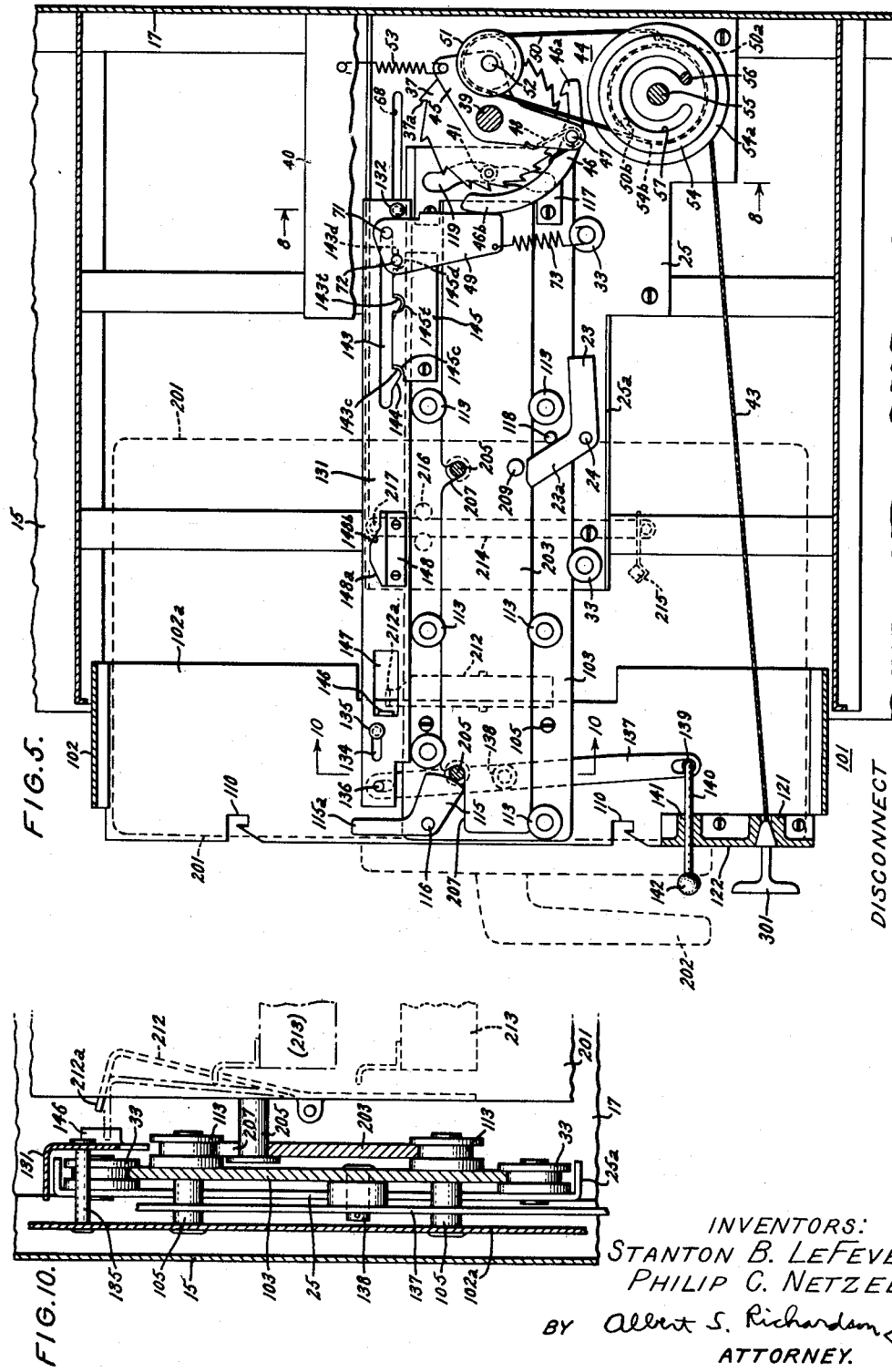
INVENTORS:
STANTON B. LEFEVER,
PHILIP C. NETZEL,
BY Albert S. Richardson Jr.
ATTORNEY.

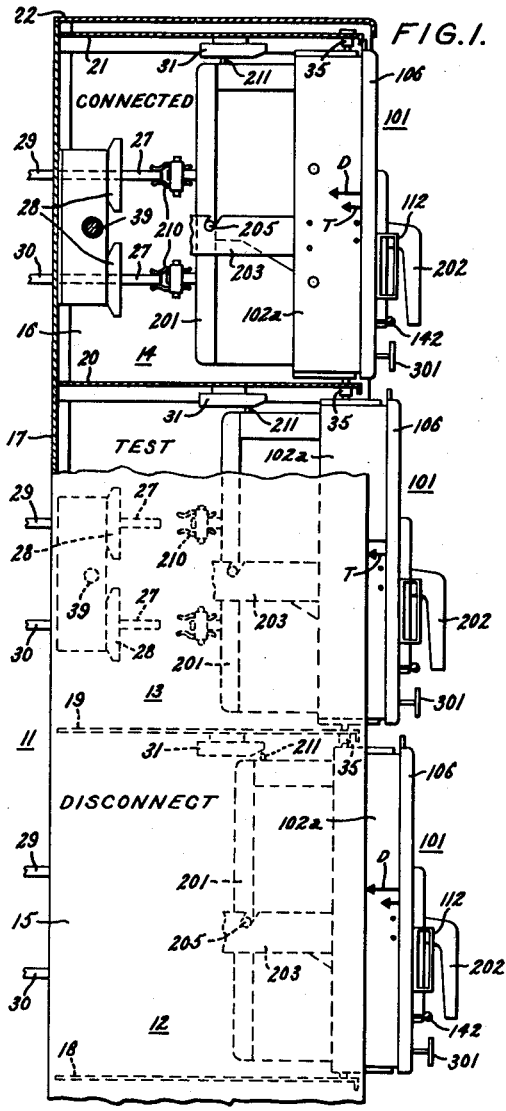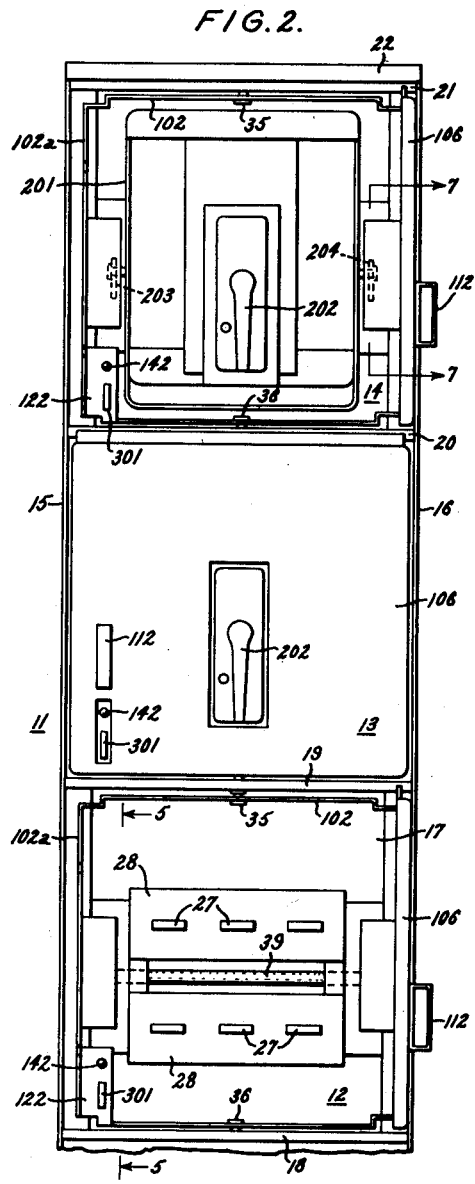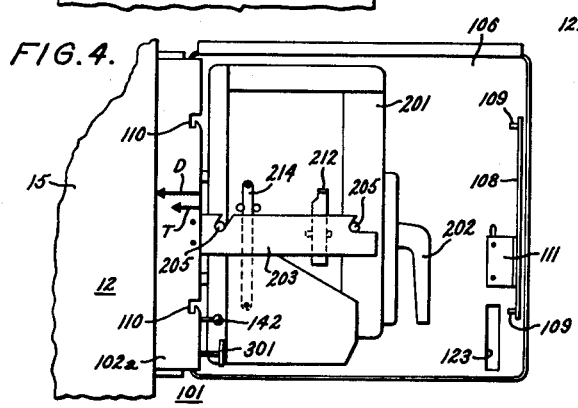

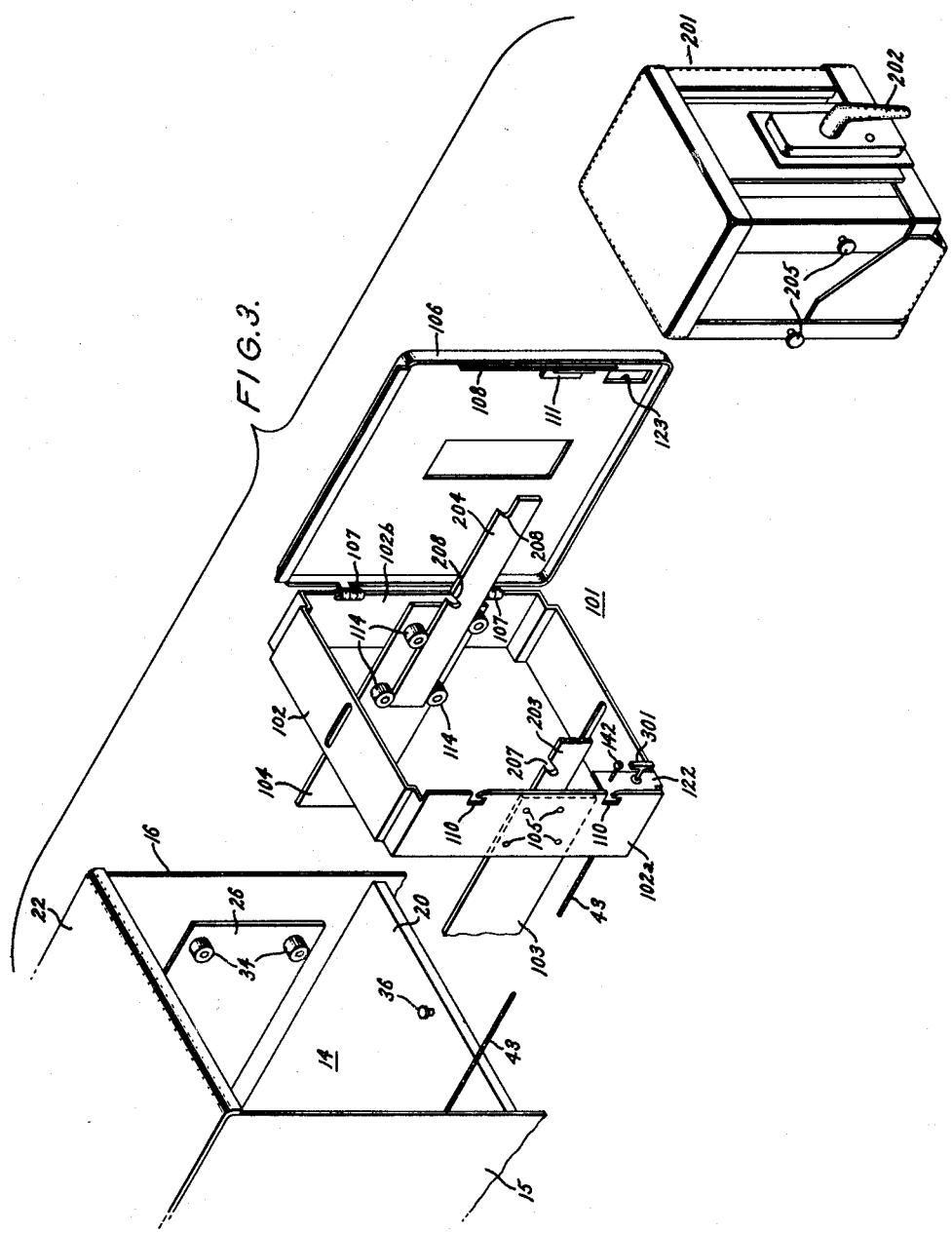

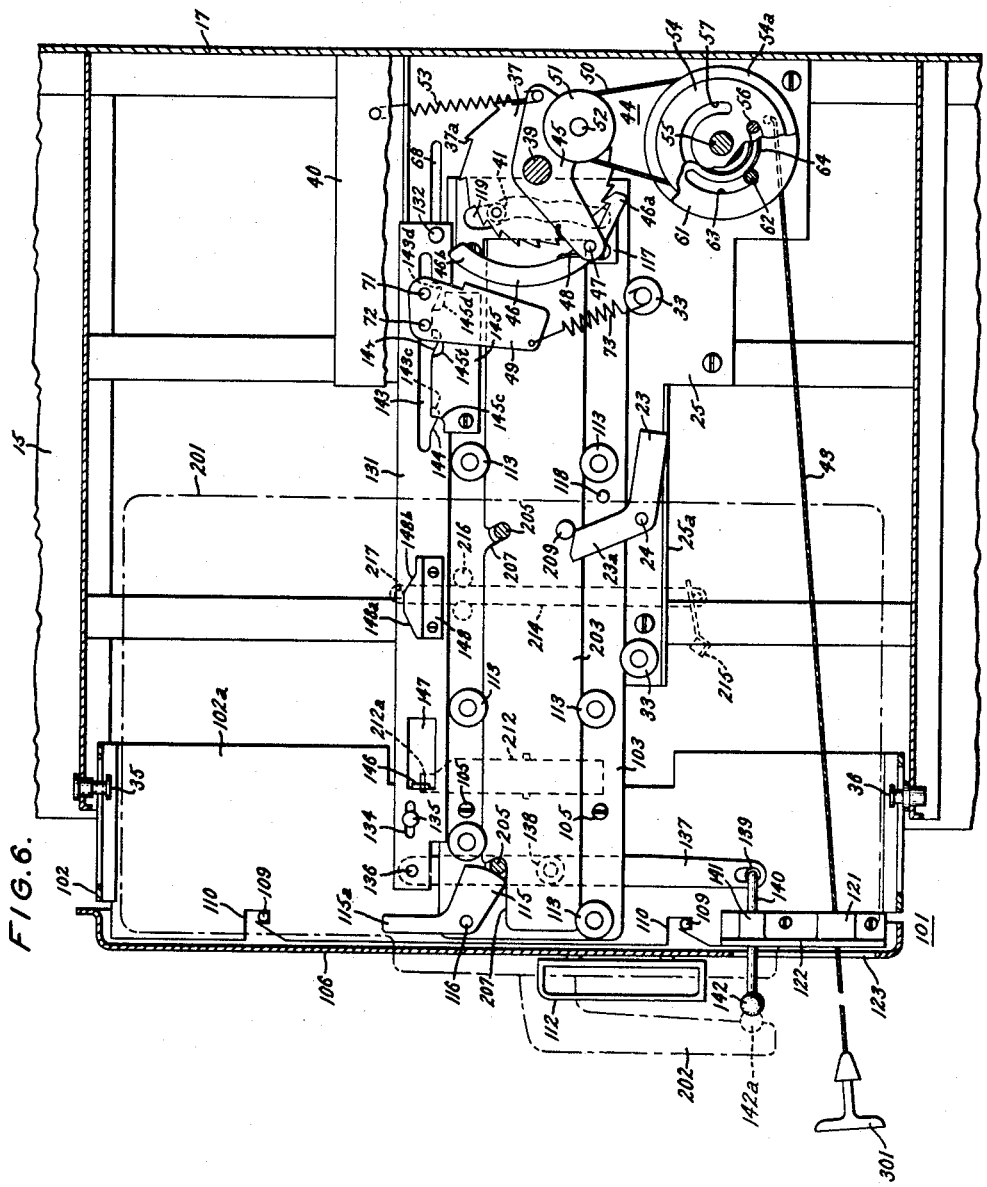

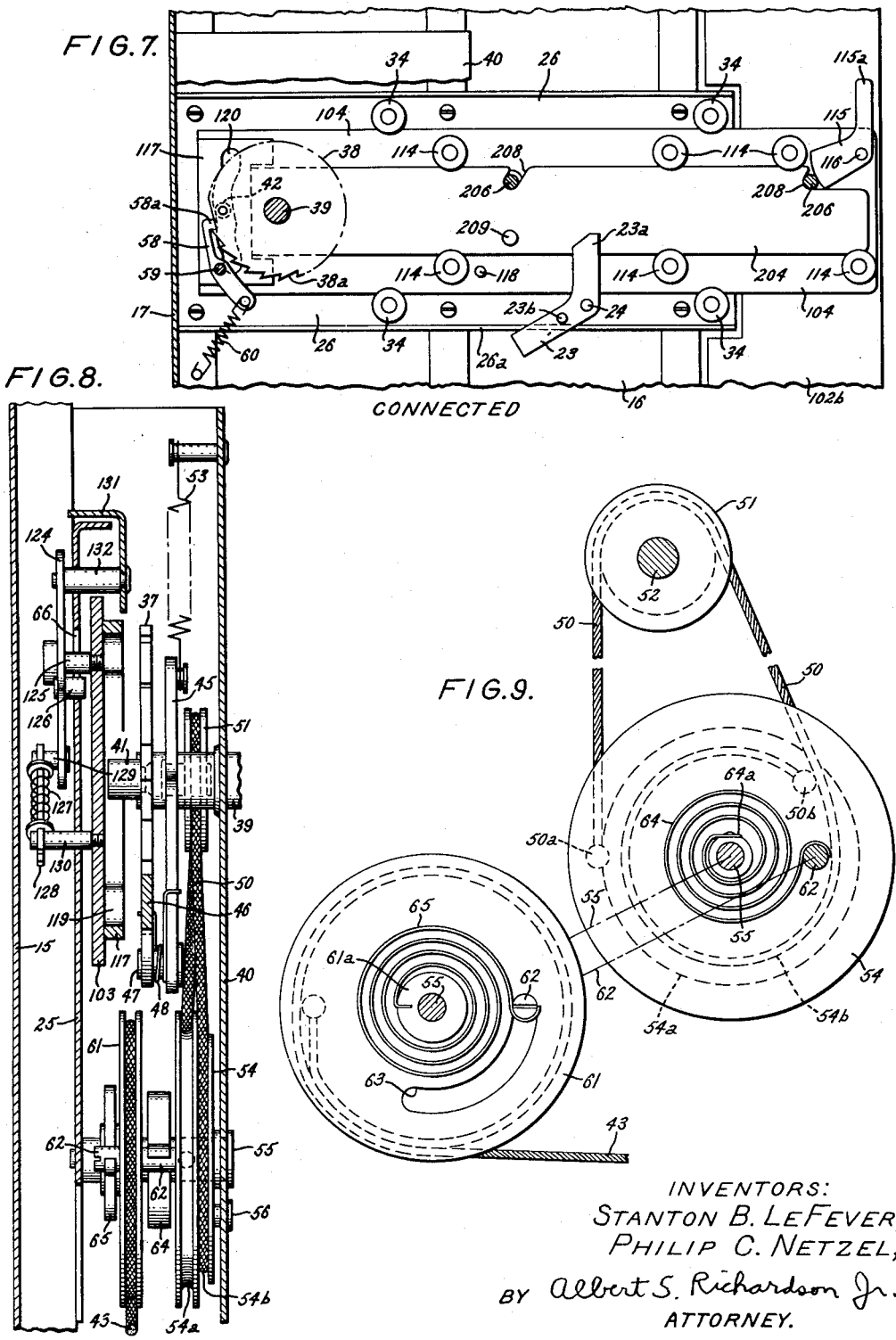

:::::
United States Patent Office 3,193,633
Patented July 6, 1965

---

3,193,633
RACKING MECHANISM INCLUDING A
DIFFERENTIAL PULLEY SYSTEM
Philip C. Netzel, Milmont Park, Pa., and Stanton B. Le Fever, Staunton, Va., assignors to General Electric Company, a corporation of New York
Filed July 2, 1962, Ser. No. 215,757
(Filed under Rule 47(a) and 35 U.S.C. 116)
2 Claims. (Cl. 200—50)

This invention relates to a racking mechanism including a differential pulley system, and more particularly it relates to a differential pulley system arranged in cooperation with a levering mechanism for inserting and withdrawing an electric circuit interrupter or the like into and out of a relatively stationary enclosure.

Our invention is applicable to electric power switchgear where it is customary practice to house removable circuit interrupters or breakers in individual cells or compartments of a grounded sheet-metal enclosure. The current-conducting parts of the circuit breaker are connected for energization to associated supply and load circuits by means of cooperating, separable "disconnect" members, with suitable means being provided for moving the breaker unit to and from its connected or fully inserted position within the compartment. Thus the breaker can be readily withdrawn from its housing for repair or maintenance purposes.

The means provided for guiding and driving the movable circuit breaker unit to and from its connected position in the enclosing compartment is generally known as a drawout mechanism. Usually such a mechanism includes force amplifying means for impelling or racking the circuit breaker unit along its course of movement with the exertion of only a reasonable amount of manual effort by an operator. The racking means conventionally includes a camming member which imparts movement to the breaker unit when operated, and it is a general object of our invention to provide improved means having high mechanical advantage for operating such a camming member.

Another object of the present invention is to provide an improved racking mechanism where unusually high mechanical advantage is obtained by a pulley system which occupies relatively little space.

It is a further object to provide improved force transmitting and amplifying means of a compact and versatile construction in a racking mechanism which has utility in a variety of different settings.

The illustrated embodiment of our invention has previously been disclosed in a copending patent application S.N. 154,942, filed for Philip C. Netzel on November 27, 1961, and assigned to the assignee of the present application. In that copending patent application a novel racking mechanism, comprising a rotatable ratchet wheel operated by an oscillatory pawl which is coupled to a manually operative handle by means of a flexible cable, is claimed. As disclosed in the Netzel application, the mechanical advantage of the mechanism is preferably augmented by a differential pulley system which is the claimed subject matter of the present application, and one of the specific objects of our invention is the provision of a differential pulley system especially well suited to the functional needs of the particular racking mechanism which is claimed in the aforesaid Netzel application.

In carrying out our invention in one form, an electric apparatus supporting unit is disposed for movement relative to the cooperating stationary compartment, and a racking mechanism including a camming member is provided to impart said relative movement to the supporting unit. In order to operate the camming member, we provide a differential pulley system comprising an output pulley coupled to the camming member, a double pulley disposed for rotation about an axis which is stationary relative to the axis of the output pulley, and suitable means for rotating the double pulley. The double pulley has greater and lesser rims of different diameters. An elongated flexible member attached at one end to the greater rim of the double pulley is looped tautly over the output pulley and wrapped around the lesser rim to which its other end is attached. Upon rotation of the double pulley so that the flexible member is wound around the greater rim and unwound from the lesser rim, the output pulley is pulled toward the double pulley in a manner operating the camming member to which it is coupled.

Our invention will be better understood and its various objects and advantages will be more fully appreciated from the following description taken in conjunction with the accompanying drawings in which:

FIG. 1 is a side elevational view, partly broken away, of a 3-compartment enclosure for movable circuit breaker units, with the respective breaker units being shown in three different positions;

FIG. 2 is a front elevational view of the enclosure of FIG. 1, with the doors of its upper and lower compartments open and with the circuit breaker removed from the lower compartment;

FIG. 3 is a simplified exploded perspective view of the combination of a compartment, a circuit breaker supporting unit, and a circuit breaker;

FIG. 4 is a partial side elevational view of the lower breaker compartment shown in FIG. 1, with the circuit breaker fully withdrawn therefrom;

FIG. 5 is an enlarged sectional view of the lower breaker compartment taken along lines 5—5 of FIG. 2 to illustrate a preferred embodiment of our invention;

FIG. 6 is a sectional view similar to FIG. 5 showing the breaker supporting unit in a different disposition;

FIG. 7 is an enlarged sectional view of the upper breaker compartment along lines 7—7 of FIG. 2;

FIG. 8 is an enlarged sectional view of the compartment racking mechanism taken along lines 8—8 of FIG. 5;

FIG. 9 is an enlarged exploded view of the differential pulley system of our invention, as seen from the left-hand side of FIG. 8; and FIG. 10 is an enlarged sectional view along lines 10—10 of FIG. 5.

Referring now to FIGS. 1 and 2, there is shown a stationary sheet-metal housing or enclosure 11 for electric apparatus comprising three vertically stacked individual units or compartments 12, 13 and 14. A pair of upstanding metal side sheets 15 and 16 and a vertically disposed rear barrier 17 form three sides of each of the generally cubic compartments 12–14. Horizontal plates or barriers 18, 19 and 20 provide bottom closures for the respective compartments. The top closure of compartment 12 is provided by the barrier 19; the top closure of compartment 13 is provided by the barrier 20; and the top closure of compartment 14 is provided by still another horizontally disposed metal barrier 21. Each of the compartments has an opening at its front. The housing is topped by a trim plate 22 as shown.

Each compartment or enclosure unit comprising the housing 11 includes between its sidewalls a movable inner part or unit 101 for supporting electric apparatus. Since this part as shown is identical in all three compartments 12–14, the same reference numeral 101 has been used to identify it in each instance. The movable inner unit provides a suitable carriage or supporting means for electric apparatus, and it can be constructed in any appropriate manner for this purpose. However, in the particular embodiment of our invention that is set forth herein for the sake of illustration, the apparatus-supporting inner unit 101 has been constructed and arranged in accordance with the teachings of a copending patent application S.N. 154,960 filed for Philip C. Netzel on November 27, 1961, and assigned to the assignee of the present application.

As is best seen in FIG. 3, which is a simplified exploded perspective view of compartment 14, the illustrated inner unit 101 comprises a short metal collar 102—disposed telescopically to fit into the rectangular opening of the associated enclosure unit—and a pair of parallel, elongated supporting members or runners 103 and 104 to which the collar 102 is rigidly fastened by rivets 105 or the like. The runners 103 and 104 are attached to opposite walls of the enclosure unit for movement relative thereto, and consequently the collar 102 can be extended out in front of the compartment sidewalls 15 and 16. The whole inner unit 101 is able to undergo reciprocating movement through the compartment opening between an initial or retracted position within the compartment (see compartment 14 in FIGS. 1 and 7) and a final or extended position partially without the compartment (see compartment 12 in FIGS. 1 and 5).

The movable inner unit 101 associated with each stationary enclosure unit, as it moves in between the above-mentioned retracted and extended positions, traverses a predetermined intermediate position (see compartment 13 in FIG. 1). The significance of this intermediate position will be explained hereinafter. For the purpose of visually indicating when the inner unit is in its extended position and when it is in the predetermined intermediate position, a pair of parallel lines D and T of different lengths are located on the left side panel 102a of the extensible collar 102, as is shown in FIG. 1. Both of the lines D and T, which may be appropriately labeled, are hidden by the side sheet 15 and are therefore entirely out of sight when the collar is retracted.

Each of the movable inner units 101 of the housing 11 supports an openable cover 106 which provides access to the associated enclosure unit. Preferably the access cover comprises a metal door hinged at 107 to the front edge of the right side panel 102b of collar 102, as is shown in FIG. 3. The door 106 carries a latchbar 108 from which a pair of pins 109 laterally extend (FIG. 4) for entering, respectively, two notches 110 formed at different elevations in the front edge of the left side panel 102a of collar 102. The latchbar 108 is connected by means of an angle from 111 or the like to an appropriate door handle 112 which is located on the front side of the door 106 (see FIGS. 1, 2 and 6); the door is unlatched and swung open by manually raising and then pulling on handle 112. From FIG. 3 is is apparent that the collar 102 in effect comprises a door frame for the compartment door 106.

Whenever the compartment door is shut it completely closes the collar 102 and hence covers the front opening of the associated compartment, whereby the contents of the compartment are safely confined behind the metal shield which the door provides. The door 106, being attached to the collar 102, travels with the inner unit 101 of the compartment as it is moved to its extended position. Although the collar and door then protrude in front of the compartment, the enclosed apparatus is not exposed but remains substantially wholly enclosed because the top and bottom panels and the side panels 102a and 102b forming the collar 102 will bridge the gap left between the door 106 and the front edges of the stationary walls 15, 16, 20 and 22 of the compartment. Consequently the apparatus which the compartment encloses can be safely stored in an isolated state with the movable unit 101 extended, collar 102 in conjunction with the door 106 serving to protect operating personnel as well as to prevent contamination of the apparatus by dust and the like.

In the illustrated embodiment of our invention, the apparatus which each movable unit 101 is designed to support comprises an electric circuit breaker or interrupter identified generally by the reference numeral 201. The circuit breaker 201, which may be of any standard construction, has an operating handle 202 protruding from its front escutcheon for manual actuation thereof. As indicated most clearly in FIGS. 1 and 2, the handle 202 projects through an appropriate aperture in the compartment door 106 for convenient operation from in front of the housing.

As can be seen in FIGS. 3, 5 and 7, the circuit breaker supporting unit 101 is equipped with two sets of rollers 113 and 114 carried by the runners 103 and 104, respectively for receiving a pair of rails 203 and 204 on which the circuit breaker 201 is removably disposed. There are two pairs of spaced apart lugs or pins 205 and 206 protruding laterally on opposite sides of the circuit breaker, and these pins are received, respectively, in approriate recesses 207 and 208 provided in the top edges of the rails 203 and 204, as shown.

The circuit breaker 201 and the rails 203 and 204 on which it is mounted, all moving as a unit, can be slidably inserted and withdrawn with respect to the runners 103 and 104 of the movable supporting unit 101. Once placed between the respective rollers of the companion roller sets 113 and 114 which the runners carry, the circuit breaker and its rails are firmly yet removably supported by the runners for joint movement therewith, whereby the breaker 201 will move in concert with the supporting unit 101 throughout the limited course of reciprocating movement thereof. Toward this end, each of the runners 103 and 104 is preferably provided with a locking lever 115 which is pivotally attached at 116 to the runner near the forward end thereof. As is clearly shown in FIGS. 5–7, the locking lever has a generally L-shaped configuration, and a camming surface of its lower arm is disposed to bear against the foremost pin 205, 206 protruding from the circuit breaker 201 in a manner securely to wedge the removable parts between the lever 115 and an abutting block 117 which is affixed to the rear end of each of the runners 103 and 104. In this disposition the lever 115 also locks the circuit breaker 201 to its rails 203 and 204.

By opening the compartment door 106 and then pulling forward manually on the upper arms 115a of both of the pivotally mounted locking levers 115, the lower arms of these levers will be raised from engagement with pins 205 and 206, thereby releasing the circuit breaker for withdrawal from the housing 11 to a position in which it is shown in FIG. 4. From this withdrawn position it is a simple matter to lift the circuit breaker 201 from the rails 203 and 204 and remove it to a location remote from the enclosure for maintenance, repair or replacement purposes.

In accordance with the teachings of the aforesaid copending Netzel application S.N. 154,960, special interlock means are provided to prevent the installation of the removable circuit breaker 201 in an enclosure unit of the housing except when the associated circuit breaker supporting unit 101 is in its fully extended position. The interlock means referred to, as can be seen in FIGS. 5 and 7, preferably comprises a pair of generally L-shaped interference levers 23 pivotally attached at 24 to left and right-hand sidewall brackets 25 and 26, respectively, of the stationary enclosure unit, in cooperation with a pair of pins 118 projecting inwardly from the extensible runners 103 and 104 and another pair of inwardly projecting pins 209 which are affixed to the breaker rails 203 and 204, respectively. The pins 209 are at a higher elevation than the pins 118 which in turn are higher than the points 24 of pivotal attachment of the interference levers 23.

Each interference lever 23 is biased by gravity to a normal disposition (shown in FIG. 7) in which the upper arm 23a thereof rises vertically from its pivot 24 and extends across the path of movement of both of the associated pins 118 and 209. The arm 23a cannot be moved rearwardly from its upright position because the lower arm of the lever 23 has been provided with a laterally projecting tab or pin 23b which overlays the stationary flange 25a, 26a of the adjacent sidewall bracket 25, 26 thereby blocking such movement. Consequently, assuming that the circuit breaker 201 were removed from the housing, so long as the interference levers 23 are in their normal dispositions the return of the removable breaker is blocked by the upright arms 23a whose forward edges will be engaged by the pins 209, respectively, to prevent full insertion of the rails 203 and 204 into the runners 103 and 104, respectively.

The interference levers 23 quit their normal dispositions and will not impede the return of the circuit breaker to its supported position on runners 103 and 104 whenever the retractable movable unit 101 of the compartment is in its extended position (shown in FIG. 5). This disabling of the interlock means is accomplished by the action of the pins 118 which travel forward with the runners from which they project and, just as the movable unit 101 closely approaches its extended position, move into engagement with the rear edges of the upper arms 23a of the levers 23, whereby both arms 23a are tilted frontwardly and held by the pins 118 in a position which is below the path of movement of the breaker rail pins 209. It is apparent that so long as the unit 101 remains in its extended position, the levers 23 will not interfere with the ingress of a removable circuit breaker 201.

Returning again to FIG. 1, the circuit breaker unit disposed in each enclosure unit of the housing 11 is seen to include spring-loaded "primary" disconnect members 210 which are aligned, respectively, with stationary "primary" disconnect members 27 mounted on insulating bases 28 suspended from the rear wall 17 of the housing. In each enclosure unit or compartment the disconnect members 210 and 27 are interengaged whenever the movable unit 101 which supports the circiut breaker 201 is retracted (see compartment 14 in FIG. 1), while they are separated and hence disconnected whenever the movable unit has been extended as far as its intermediate position (see compartment 13 in FIG. 1). These cooperating primary disconnect members enable the circuit interrupting contacts (not shown) of each circuit breaker 201 to be electrically connected to supply and load circuits 29 and 30, whereby the flow of electric power to the load circuit is controlled by operation of the circuit breaker contacts. The equipment illustrated is most commonly used for controlling and protecting 3-phase power circuits; hence 3-pole breakers are used, and each enclosure unit has three pairs of disconnect members 27, as is shown in the compartment 12 in FIG. 2.

Circuit breakers of the kind illustrated are often equipped with suitable mechanisms for "electrical" operation thereof. That is, the breakers include devices such as motors, solenoids and the like for the purpose of opening and closing their circuit interrupting contacts in response to operation of suitable control switches (not shown) located locally or remotely therefrom. Such devices must be connected to appropriate control wiring and circuits in the stationary housing 11, and for this purpose separable "secondary" disconnect members are provided, as shown by way of example in FIG. 1 at 211 and 31. A secondary disconnect member 211 comprising a plurality of upstanding, yieldable conductive fingers is carried by each circuit breaker unit on top thereof, and a secondary disconnect member 31 having a plurality of spaced-apart conductive bars depends from each horizontal barrier 19–21 of the stationary enclosure. In each of the enclosure units the respective conductive elements of these cooperating members are slidably interengaged so long as the movable unit or inner part 101 of the compartment is in either its retracted or its intermediate positions (see compartments 14 and 13 in FIG. 1), but they become disconnected upon movement of the circuit breaker unit to its predetermined extended position (see compartment 12 in FIG. 1).

It is apparent now that the three different positions of the illustrated breaker supporting unit 101—namely, the retracted and extended positions at opposite ends of its limited course of reciprocating movement and the intermediate position traversed therebetween—correspond to (1) the fully inserted or operating position of the removable circuit breaker 201, where both the primary and secondary sets of the disconnect members are respectively connected to energize the circuit breaker, (2) an intermediate or "test" position of the breaker, where only the secondary disconnect members are interconnected, and (3) a disconnect or storage position, where all of the cooperating disconnect members are separated so that the breaker 201 is entirely deenergized. The purpose of the above-mentioned intermediate or test position (which is positively defined by position stop means to be described hereinafter) is to allow testing of the breaker's electrical operation without energizing the load circuit 30 each time the interrupting contacts of the circuit breaker being tested are closed.

It has been noted hereinbefore that the movable inner unit 101, which supports the circuit breaker 201 and carries it between the preselected positions reviewed above, is telescopically disposed in the enclosure unit. In order to support the inner unit 101 for its reciprocating movement in the enclosure unit, two sets of rollers 33 and 34 are mounted on the stationary sidewall brackets 25 and 26, respectively, for receiving the two runners 103 and 104 on which the collar 102 of the unit 101 is mounted. See FIGS. 3 and 5–7. As is best seen in FIGS. 1–3 and 6, the top and bottom panels of the collar 102 are both slotted to accommodate a pair of stationary guide pins 35 and 36 which have enlarged heads and project vertically a short distance from the top and bottom closures, respectively, of the associated compartment.

To aid in driving the collar 102 and its supporting runners 103 and 104 through the limited course of reciprocating movement thereof, and thereby move the circuit breaker 201 between its operating and storage positions, a racking mechanism is provided. The racking mechanism includes a pair of orbital camming members or cranks 37 and 38 which, in the illustrated embodiment of our invention, are mounted on stationary walls of the enclosure unit in motion transmitting relationship with the breaker supporting runners 103 and 104, respectively. The members 37 and 38 preferably comprise ratchet wheels or discs respectively keyed to opposite ends of a common shaft 39. As is shown in FIGS. 1 and 2, the rotatable shaft 39 horizontally spans the rear of the associated enclosure unit, and it is journaled near both ends in stationary plates 40 (FIG. 8) which are appropriately affixed to the enclosure walls in spaced relation to the sidewall brackets 25 and 26, respectively.

The ratchet wheel 37 is affixed to the left end of the shaft 39 between bracket 25 and plate 40, and it is located immediately adjacent to the block 117 which is fastened to the rear end of runner 103. A camming element 41 is integrally associated with this wheel. As it is shown in FIGS. 5, 6 and 8, the camming element 41 comprises an eccentric cam roller which projects from the wheel 37, in axially parallel relationship therewith, into a generally vertical camming slot 119 formed in the block 117. Thus the block 117 serves as a cooperating camming element with which the element 41 is inseparably engaged. At the right end of the common shaft 39 the ratchet wheel 38 is positioned immediately adjacent to the block 117 which is affixed to the rear end of the runner 104, and it similarly carries an eccentric cam roller 42 which projects into generally vertical camming slot 120, shown in FIG. 7. The height of each of the camming slots 119 and 120 is slightly greater than the diameter of the path circumscribed by the cam roller.

As the ratchet wheels 37 and 38 rotate, their eccentric rollers 41 and 42 will orbit in unison about the fixed axis of the common shaft 39, riding up and down in the associated camming slots 119 and 120 of the respective blocks 117 with which the rollers are interengaged. The resulting coaction between these cooperating elements will translate the runners 103 and 104; hence the whole inner unit 101 is moved or racked from its retracted position in the enclosure unit to its extended or protruding position and back.

In order to rotate the ratchet wheels 37 and 38, the racking mechanism includes operating means having sufficient mechanical advantage to enable a person of ordinary strength to carry out the racking operation manually with the exercise of only a reasonable amount of physical effort. Preferably this operating means comprises a T-handle 301 which is operatively coupled to the rotatable ratchet wheel 37 by means of a flexible cable 43, the differential pulley system 44 of our invention, a pivotally mounted lever 45, and a ratchet operating pawl 46.

As can be seen in FIGS. 5 and 6, the ratchet operating pawl 46 is a long curved arm pivotally mounted between its ends on a pin 47 which is carried by an output arm of the lever 45. The head of the pawl is provided with a hook 46a for driving the peripheral teeth 37a of the adjacent ratchet wheel 37 upon movement of the lever and pawl in a clockwise direction. A torsion spring 48 is disposed on pin 47, as is best seen in FIG. 8, to tilt the pawl 46 counterclockwise about its mounting pin 47, whereby the hook 46a yieldably engages the ratchet teeth 37a as shown in FIG. 6. However, this operative interengagement between hook 46a and teeth 37a can be prevented, and hence the racking mechanism will be disabled, by an interlock member 49 which moves, under circumstances that will later be explained, to a position where it engages the tail 46b of pawl 46 and tilts the pawl clockwise against its bias, whereby the hook 46a is held off the teeth 37a, as shown in FIG. 5. The construction, operation and purpose of this disabling means will be explained following a description of the rest of the racking mechanism.

The lever 45 which carries the ratchet operating pawl 46 is pivotally mounted on the shaft 39 adjacent to the ratchet wheel 37 for oscillatory movement with respect thereto, whereby the pawl is movable back and forth along an arcuate path with respect to the axis of shaft 39. As viewed in FIGS. 5 and 6, it is apparent that the lever 45 in essence is a bell crank which, when pivoted clockwise, so moves the pawl 46 as to advance the ratchet wheel 37 in a forward (clockwise) direction. In accordance with our invention, the pawl mounting lever is actuated in a clockwise direction by a cable 50 which extends over a pulley 51 rotatably mounted on a pin 52 projecting from an input arm of the lever 45 in quadrature with the pin 47, the pin 52 being closer to the axis of shaft 39 than pin 47. A tension spring 53 connected between the lever 45 and the stationary mounting plate 40 biases the lever and pawl 46 in a counterclockwise direction. The lever and pawl are moved clockwise when the pulley 51 is pulled downward. It is now apparent that angular advancement of the ratchet wheel 37 is effected in a step-by-step manner upon oscillation of this lever-and-pawl combination.

Cable 50 and pulley 51 are part of the differential pulley means or system 44 for operating wheel 37 with considerable mechanical advantage. As indicated in FIG. 9, the cable 50 is an elongated flexible member attached at opposite ends 50a and 50b, respectively, to two different rims 54a and 54b of a double pulley 54. The double pulley 54, which alternatively could be two separate pulleys fastened together for rotation as a unit, is rotatably disposed on a fixed shaft 55 located directly under the pulley 51. As is best seen in FIG. 8, the ends of the shaft 55 are respectively anchored to the stationary bracket 25 and plate 40 of the enclosure unit. A stop pin 56 protrudes from the stationary plate 40 a short way from shaft 55 and is disposed in a 330-degree concentric groove 57 formed in the side of the double pulley; consequently the rotation of this pulley is limited to 330 angular degrees.

The rim 54a of the double pulley 54 of our differential system has a greater diameter than the adjoining rim 54b. One end 50a of the cable 50 is affixed to the greater rim 54a as shown in FIGS. 5 and 9. The cable then loops tautly over the companion pulley 51 and is wrapped in a counterclockwise sense (as viewed in FIG. 5) at least once around the lesser rim 54b of the double pulley 54, with the opposite end 50b of the cable being anchored to the lesser rim at a point which is almost diametrically opposed to the cable end 50a. The pulley 51 over which cable 50 extends is the output pulley of the differential system, and being mounted on the lever 45 it is disposed in variably spaced relation to the double pulley 54.

Upon rotation of the double pulley 54 through 330 degrees in a clockwise direction, from the starting position in which it is shown in FIG. 5 to an angular position shown in FIG. 6, the cable 50 is payed out of the lesser rim 54b and is wrapped onto the greater rim 54a. Because of their different diameters, more cable is taken up by the greater rim 54a than unwinds from the lesser rim 54b, and the cable loop extending over the pulley 51 is therefore constricted. In response to this loop constriction, the output pulley 51 is pulled (with a large mechanical advantage being realized) by the cable 50 toward the double pulley 54 whose axis is relatively stationary, and the lever 45 will be tilted clockwise on shaft 39 through an angle of about 36 degrees, whereby the pawl 46 is actuated to effect advancement of the rotatable ratchet wheel 37 by a predetermined number of degrees.

Since the ratchet wheel 37 is keyed to the shaft 39, the shaft also rotates and the companion ratchet wheel 38 is turned in a forward direction through the same angular increment. As is shown in FIG. 7, the peripheral teeth 38a of the latter wheel are yieldably engaged by a holding pawl 58. This pawl is pivotally supported by means of a pin 59 mounted on stationary plate 40, and a hooked end 58a thereof is biased into engagement with the ratchet teeth 38a of the wheel 38 by an appropriate tension spring 60. The holding pawl 58 in cooperation with the ratchet teeth 38a serves positively to prevent appreciable back-tracking (turning in a backward direction) by the ratchet wheels 37 and 38 while the ratchet operating pawl 46 returns from its FIG. 6 disposition to its starting position shown in FIG. 5. There are more teeth on the ratchet wheels than needed for racking purposes, the additional teeth being provided to insure that the holding pawl 58 will be effective to prevent appreciable back-tracking even in the event of incomplete actuation of the ratchet operating pawl through a subnormal oscillation (less than 36 degrees).

In order to rotate the double pulley 54 in a clockwise direction, thereby effecting ratchet-advancing movement of the pawl 46 as explained above, a driving pulley 61 is rotatably supported adjacent thereto on the shaft 55. The driving pulley 61, which can be seen in FIGS. 6, 8 and 9, is connected to the manually operative T-handle 301 by means of a flexible connecting member, preferably the sturdy aircraft control cable 43 shown. The cable 43 is anchored at one end to the handle 301, and its opposite end is affixed to the rim of the pulley 61 about which it is wrapped more than one full turn. By grasping the handle 301 and pulling on the cable 43, the driving pulley 61 is rotated about its axis in a clockwise direction, as viewed in FIG. 6.

The rim of the driving pulley 61 may be of any desired diameter; as shown its diameter is the same as that of the greater rim 54a of the double pulley 54. As is taught in the aforesaid Netzel application S.N. 154,942, these two pulleys are operatively coupled by a lost-motion connection comprising a pin 62 in an arcuate slot 63. The pin 62 is affixed to the double pulley 54 from which it laterally protrudes, as is shown in FIG. 8. The arcuate slot 63 through which the pin 62 extends is located concentrically in the web of the adjacent pulley 61, as in shown in FIGS. 6 and 9. The purpose of the lost-motion connection will be explained below. For now it will suffice to understand that, as the driving pulley 61 is rotated in a clockwise direction (as viewed in FIGS. 5 and 6), the trailing end of the slot 63 engages the pin 62 of the double pulley 54 thereby operating the double pulley in the same direction through its limited 330-degree rotation.

The actuating handle 301 for the racking mechanism is seatable in a special insert or bushing 121 of a mounting bracket 122 which preferably is affixed to the left side panel 102a of the extensible collar 102. An appropriate opening 123 in the front cover 106 makes the handle 301 conveniently accessible from outside the enclosure unit with the cover closed, as is indicated in FIGS. 1–3.

In order to oscillate the ratchet operating pawl 46 and hence incrementally advance the ratchet wheel 37, the handle 301 must repeatedly be withdrawn from its seated position or terminus in the bushing 121 as far as the attached cable 43 permits. The handle need not be moved for this purpose in a direction perpendicular to the front of the switchgear housing. Where necessary because of a narrow front aisle or otherwise tight quarters, the flexible cable 43 enables the handle 301 to be operated effectively by pulling it up, down or to the sides with respect to its terminus.

After each stroke of the handle 301 it returns automatically to its terminus 121 to which it is biased. Preferably this bias is effected by the reaction of two coil springs 64 and 65 (best seen in FIGS. 8 and 9) which are disposed to urge the driving pulley 61 in a direction recalling the cable 43. The coil spring 64, which is also partially visible in FIG. 6, is relatively strong. Its inner end is anchored at 64a (FIG. 9) to the pulley mounting shaft 55 between the pulleys 54 and 61, and its outer end is fastened to the pin 62 which protrudes from the double pulley 54. This spring is disposed to move the pin 62 in a counterclockwise direction, as viewed in FIGS. 5 and 6, whereby the double pulley is biased in a counterclockwise direction to its starting positoin shown in FIG. 5. The pin 62 acting in the lost-motion slot 63 of the driving pulley 61 tends to turn the driving pulley in the same direction. The other coil spring 65 is fastened at its outer end of the distal end of pin 62, while its inner end is anchored to the hub 61a of the driving pulley 61. This relatively weak spring is stressed upon angular movement of the driving pulley, relatively to the pin 62, in a clockwise direction, and hence the pulley 61 is additionally biased in a counterclockwise direction toward an initial position in which the leading end of its slots 63 would engage the pin 62.

The purpose of a lost-motion connection (comprising the pin 62 and slot 63) between the driving pulley 61 and the differential pulley system 44 will now be apparent. In the illustrated racking mechanism the terminus of the operating handle 301 is associated with the relatively movable breaker supporting means 101 and hence travels therewith during racking operation, while the axis of the pulley mounting shaft 55 is fixed. Consequently, the free length of cable 43 extending between the handle terminus and the driving pulley varies in dependence upon the position of the circuit breaker unit along its course of reciprocating movement. This length is shorter when the supporting unit 101 is retracted than when extended.

To compensate for such variance, the lost-motion slot 63 is provided, and its length is made approximately equal to the overall distance which the unit 101 travels between opposite limits of its reciprocating movement. All variations in the free length of the cable 43 will thus be accommodated by the driving pulley 61 which, during withdrawal of the operating handle 301 from terminus 121, is able to rotate freely, before the trailing end of slot 63 operatively engages pin 62 of the double pulley 54, through an initial angle which will progressively diminish as the unit 101 is advanced from its retracted to its extended position. As a result, the double pulley 54 can always be rotated from the same starting position through its full 330 degrees by every stroke of the handle 301. This means that the amplitude of each oscillation of the ratchet operating pawl 46 will remain substantially constant throughout the full course of reciprocating movement of the circuit breaker unit, and the ratchet wheel 37 is advanced in equiangular increments. In lieu of such a lost-motion connection, the ratchet teeth 37a might be disposed at appropriately graduated intervals to compensate for the above-mentioned variance in the free length of cable 43, but this alternative arrangement would not be as satisfactory because it would necessitate extra strokes of the actuating handle 301 to move the circuit breaker unit near its extended position.

The ratchet wheel and pawl type racking mechanism, operated by the manual handle 301 and flexible cable 43 as it is shown in the drawings and described hereinbefore, is the claimed subject matter of the aforesaid Netzel application S.N. 154,942. Those skilled in the art will understand that this preferred mechanism is but one illustrative example of various available racking means which might utilize the compact force-amplifying differential pulley system 44 of the present invention. Our system's versatility will also be readily apparent; the location of the output pulley 51 and the length of the cable 50 may conveniently be changed and adapted to suit the particular physical dimensions and configuration of a wide variety of mechanism environments.

In order more clearly to understand the manner in which the above-described racking mechanism drives the retractable inner unit 101 along its course of reciprocating movement, a rack-in operation of the mechanism will now be briefly described. For this particular purpose, no consideration is given to the automatically operative position stop means and the accompanying reset means for manually releasing the same. Their structure and operation, to be described soon hereinafter, can be disregarded here. In this connection, it should be assumed that the interlock member 49 is out of engagement with the tail of pawl 46 and that nothing interfers with the rack-in operation being described.

Before beginning the rack-in operation, the inner unit 101 of the enclosing compartment is in its extended position, and the circuit breaker 201 supported thereby is in its corresponding "disconnect" or storage position. This is shown in FIG. 5, where the cam roller 41 of the racking mechanism, riding in the camming slot 119 of the supporting runner 103 of unit 101, is seen to be located at the most frontwardly disposed point of its orbit. The double pulley 54 and hence the oscillatory lever 45 of the racking mechanism are both shown in their starting positions in FIG. 5, and the racking handle 301 is at rest at its terminus in the bushing 121.

The first step of the rack-in operation is begun by pulling the handle 301 from in front of the compartment so as to extend the cable 43 thereby rotating the driving pulley 61, and conjunctively the double pulley 54 which is coupled thereto in a clockwise direction through 330 degrees. This constricts the cable loop 50 and thereby pulls downward the output pulley 51 which tilts the lever 45 clockwise. It should be noted here that the output pulley of our compact differential system moves a much shorter total distance than the handle 301, and a high force amplification factor is thereby achieved. During this movement the ratchet operating pawl 46 drivingly engages one of the peripheral teeth 37a of the ratchet wheel 37 to advance this wheel through about 30 degrees. As a result the cam roller 41 is moved clockwise along its orbital path, thereby rising in the camming slot 119 and camming the runner 103 rearwardly. The same camming action takes place between the other runner 104 and the companion ratchet wheel 38 which is keyed with wheel 37 to the common shaft 39.

The disposition of the various parts of the racking mechanism at this point is illustrated in FIG. 6. It will be observed that the amount by which the inner unit 101 of the compartment is retracted during the first step of the rack-in operation (and during each of the successive steps which follow) depends upon the radius of the orbital path, the particular angle of advancement of the cam roller, and the contour or profile of that portion of the camming slot which the roller traverses.

Upon completing the first stroke of the racking handle 301 (and each of the successive strokes which follow), the handle is allowed to return to its terminus. During this return the coil spring 64 effects counterclockwise rotation of the double pulley 54 toward its starting position, and the driving pulley 61 is correspondingly turned, thereby recalling the extended cable 43. Due to the differential rims on the double pulley, the loop of cable 50 is distended. Consequently the bias spring 53 now tilts the oscillatory lever 45 counterclockwise, and the ratchet operating pawl 46 returns to its starting position. Here it is again positioned for drivingly engaging another one of the peripheral teeth 37a which succeeds by about 30 angular degrees the one tooth previously engaged. The starting position of the double pulley 54, and hence the starting position of the lever 45, is determined by stop pin 56 which is located in the pulley groove 57. The lost-motion connection comprising the pin 62 in slot 63 enables the driving pulley 61 to continue turning in the counterclockwise direction, under the influence of bias spring 65, until the racking handle 301 has attained its terminus.

Having now concluded the first step of the rack-in operation, the handle 301 is again withdrawn from its terminus in order to continue the angular advancement of the ratchet wheels 37 and 38, whereby the inner unit 101 is further retracted in a manner precisely the same as that described above. The ratchet teeth 37a have been so arranged that the inner unit 101 will just reach its predetermined intermediate position, corresponding to the "test" position of the removable circuit breaker 201, at the end of the second stroke of the handle.

Four more successive strokes of the racking handle 301 will oscillate the ratchet operating pawl 46 in a manner incrementally advancing the cam rollers 41 and 42 of the racking mechanism to the most rearwardly disposed points of their respective orbits. The movable inner unit 101 has now been driven from its intermediate position to its retracted position shown in FIG. 7, wherein the removable circuit breaker 201 resides in its "connected" or operating position. During this final phase of the rack-in operation, the spring-loaded primary disconnect members 210 will engage the cooperating disconnect members 27, and consequently the frictional forces which resist and oppose movement of the inner unit are significantly increased. For the purpose of overcoming this increased "back pressure" without objectionably increasing the input energy required of the operator, the profile of the camming slots 119 and 120 has been designed to provide, in cooperation with the rotatable ratchet wheels 37 and 38, respectively, appropriately increased mechanical advantage at those stages of travel of the inner unit 101 where the back pressure is greatest. This special profile is illustrated in FIGS. 5–7 and 9.

As can be seen in FIG. 7, the holding pawl 58, which engages the peripheral teeth 38a of the ratchet wheel 38 to prevent appreciable back-tracking of the rotatable ratchet wheels during the rack-in operation, also helps hold the unit 101 in its retracted position against mechanical and magnetic forces which, acting on the circuit breaker 201, will urge the breaker supporting unit toward its extended position. Toward this end, the rear edge of each of the camming slots 119 and 120, substantially midway between the ends thereof, has been so inclined from vertical as to establish in conjunction with the rollers 41 and 42, respectively, a reverse movement in the ratchet wheels 37 and 38. Because of this "negative" slope of the camming slot, any spurious attempt on the part of the circuit breaker supporting unit 101 to move from its retraced position will tend to turn the ratchet wheels backward, but such reverse rotation is positively blocked by the holding pawl 58 which is engaging one of the ratchet teeth 38a. Of course the retracted unit may intentionally be extended by carrying out a rack-out operation of the racking mechanism which, like the rack-in operation described above, requires six repeated strokes of the manually operative handle 301 to incrementally advance the rotatable ratchet wheels in their forward directions through another 180 degrees, thereby driving the inner unit 101 to its extended position shown in FIG. 5.

The operating (connected), test and storage (disconnect) positions of the circuit breaker 201, to which it is moved by operating the above-described racking mechanism, are distinctly and positively defined by position stop means which will now be described. As can be seen in FIG. 8, the position stop means comprises a stop member 124—which is mounted on a pin 125 affixed to the left-hand extensible runner 103 of the breaker supporting means for pivotal movement with respect thereto—in cooperation with a notched slot 66 which is disposed in the stationary sidewall bracket 25 of the enclosure unit. The slot 66 extends fore and aft in the bracket 25, and three spaced-apart position stop notches are formed in its bottom edge. A pin 126 protruding laterally from the stop member 124 into the slot 66 will releasably enter these notches as the pin moves into proximity respectively therewith during reciprocating movement of the runner 103.

The pin 126, when approaching each position stop notch in the slot 66, is biased downwardly therein by the action of a compression spring 127. This spring is located on a spring guide rod or link 128 between a pin 129, which is affixed to the stop member 124, and a lug 130 affixed to the runner 103, so as to establish the requisite biasing torque in the member 124. The pin 125 and the lug 130 which are carried by the runner 103 are able to move rectilinearly in unison therewith, without obstruction by the stationary bracket 25, because the pin 125 is disposed for travel in the open portion of the slot 66, and the bracket 25 is appropriately slotted to accommodate the lug 130. The details of this preferred position stop means are more completely shown and described in a copending patent application S.N. 194,360, filed for Albert M. Boyden on May 14, 1962, and assigned to the assignee of the present application. The position stop notches in the slot 66 of the arrangement described above are discretely located so that the pin 126 of the stop member 124 automatically enters a notch, thereby physically blocking movement of the runner 103 and hence preventing further movement of the circuit breaker supporting means, when the retractable inner unit 101 of the breaker compartment reaches each of its three predetermined positions (retracted, intermediate and extended, respectively) corresponding to the connected, test and disconnect positions of the circuit breaker 201. So long as the stop means is thus disposed, the inner unit 101 and the circuit breaker 201 supported thereby are held in their obtained positions. They cannot be moved from such positions until the stop means has been released.

In order to release this stop means and thereby enable the inner unit 101 to be racked to its next succeeding position, a manually operative reset mechanism is provided. This mechanism is mounted on the extensible collar 102 and is so coupled to the stop member 124 as to tilt this member against its bias, thereby releasably moving the pin 126 out of the position stop notch in which it was disposed, when desired. The particular reset mechanism that is shown in the accompanying drawings, and that will now be described, is the claimed subject matter of the aforesaid Boyden application S.N. 194,360, and its details are more fully disclosed therein.

The illustrated reset mechanism, as best seen in FIGS. 5 and 6, comprises an elongated push rod or bar 131 slidably mounted on the breaker supporting means above the runner 103 for lengthwise movement relative thereto. The rear end of the push rod 131 is connected to the stop member 124 by means of a pin 132 which projects laterally from the rod through a horizontal slot 68 in the stationary sidewall bracket 25 and into a short vertically disposed slot located in the member 124. (See FIG. 8.) The rod 131 includes a guide slot 134 which slidably embraces a supporting pin 135 affixed to the left side panel 102a of the collar 102, and the forward end 136 of the rod is pinned to the upper end of a direction changing lever 137 which is pivotally mounted at 138 on the runner 103. (See FIG. 10.) The lower end of lever 137 is linked at 139 to a rod-like member 140 which is slidably disposed in a bushing 141 carried by the mounting bracket 122. The member 140 extends through the opening 123 in the front cover 106 of the breaker compartment, and it is terminated outside the housing by a conveniently accessible reset knob 142.

The push rod 131 is impelled frontwardly by the stop member 124, as its pin 126 enters a position-stop notch in slot 66, to the foremost position of the rod which is shown in FIG. 5. Consequently the reset knob 142 is "in" whenever the position stop means is in a movement-blocking disposition (FIG. 8). By manually pulling the knob 142 to an "out" or reset position (142a in FIG. 6), the lever 137 is pivoted in a clockwise direction thereby shifting the push rod 131 rearwardly with respect to the runner 103. The pin 132 projecting from the push rod moves the stop member 124 against the force of the bias spring 127, and pin 126 of the stop member is lifted from the bottom of the cooperating position-stop notch. In this manner the stop means is released or unblocked to permit continued movement of the retractable inner unit 101 and the circuit breaker 201 carried thereby to their next position.

For reasons explained in the aforesaid Netzel application S.N. 154,960, the releasable stop means described above has been disposed temporarily to disable the racking mechanism each time it operates. This disabling function is performed by the interlock member 49. The interlock member 49 is pivotally mounted on a pin 71 which is affixed to the stationary sidewall bracket 25 of the enclosure unit, and the push rod 131 has been provided with a horizontally elongated slot 143 through which the pin 71 extends. As is shown in FIGS. 5 and 6, three spaced-apart notches 143c, 143t and 143d are formed in the bottom edge of the slot 143. The interlock member 49 includes a pin 72 which protrudes laterally therefrom into the slot 143 where it will enter an appropriate one of the notches 143c, 143t and 143d, under the influence of a biasing spring 73, whenever the breaker supporting unit is in one of its three predetermined positions and the push rod 131 has been impelled to its foremost position (thus indicating that the position stop member 124 is in a movement-blocking disposition).

Whenever the pin 72 of the interlock member 49 is disposed in one of the notches of slot 143, the interlock member is tilted, as shown in FIG. 5, to an angular position wherein it engages the tail 46b of the ratchet operating pawl 46 and so tilts the pawl as to prevent its hooked end 46a from engaging the ratchet teeth 37a of the ratchet wheel 37. Consequently the cam roller 41 associated with the ratchet wheel 37 is rendered incapable of coacting with the slotted block 117 of runner 103 for the purpose of driving the circuit breaker unit from its obtained position. It is thus apparent that the racking mechanism is disabled in response to movement of the position stop member unit 101 at each of its three predetermined positions.

In order to return the interlock member 49 to a non-disabled position (in which it is shown in FIG. 6), the forward side 144 of each notch 143c, 143t and 143d in the pushrod 131 is inclined as shown. An inclined side 144 will cam the pin 72 upwardly out of the notch in which it was residing, thereby tilting the member 49 clockwise in opposition to the bias provided by spring 73, as the pushrod is shifted rearwardly during a position-stop-means releasing operation. It is therefore apparent that, by manually pulling the reset knob 142 to its reset position, the interlock member 49 is reset and the pawl 46 is again enabled to operate the ratchet wheel 37.

In order to prevent the pin 72 from prematurely falling into a notch in slot 143 while the inner unit 101 is moving between its predetermined positions, the extensible runner 103 is equipped with a raised shoulder 145 having spaced-apart indentations 145c, 145t and 145d along its upper edge. The pin 72 moves to a position directly over these respective indentations only when the circuit breaker unit attains its connected, test and disconnect positions, respectively, and consequently the raised shoulder 145 does not interfere with the above-described disabling action which will take place each time the push rod 131 is impelled frontwardly by operation of the position stop means. But the raised portion of the shoulder 145 between indentations therein, being slidably engaged by the pin 72, will keep the interlock member 49 in its reset position while the breaker unit is moving in between the aforesaid positions, even though pin 72 rides over one of the notches in slot 143 of the push rod 131 which is then in an intermediate disposition, as shown in FIG. 6, for example.

As taught in the aforesaid copending Boyden application S.N. 194,360, the push rod 131 has other means associated therewith to effect conventional breaker interlock functions which may be summarized as follows: (1) to prevent the undertaking of a racking operation if the circuit-interrupting contacts of the circuit breaker 201 are closed, and (2) to prevent closing of the circuit breaker while the racking mechanism is being operated. Toward this end, the push rod 131, as is shown in FIGS. 5, 6 and 10, includes (1) a laterally projecting tab 146 located near the forward end of the rectangular opening 147 therethrough, and (2) a laterally offset cam element 148 of trapezoidal shape, the front and rear sides (148a and 148b) of which provide inclined camming surfaces.

The circuit breaker 201 (see FIGS. 4, 5, 6 and 10) is equipped with cooperating interlock elements comprising: (1) a pivotally disposed upstanding link 212 actuated in response to circuit-closing movement of a switch member 213 of the breaker, and (2) a vertically movable tripping link 214 which is coupled to a trip latch shaft 215 for actuating the same when lifted. While the various circuit breaker parts which are connected to the switch member 213, being entirely conventional, have not been shown in the drawings, it will be understood by those skilled in the art that the switch member is moved from the broken-line position shown in FIG. 10 to the higher dot-dash-line position shown in the same figure during a closing operation of circuit-interrupting contacts of the breaker. It will further be understood that the trip latch shaft 215, upon being tilted from the angular position in which it is shown in FIG. 5 to its FIG. 6 disposition, is conventionally interconnected with the contact mechanism of the circuit breaker 201 as to effect tripping of the breaker and also to prevent subsequent closure of the circuit-interrupting contacts in a conventional manner.

In order to accomplish the first breaker interlocking function referred to, the interlock link 212 is bent over at its upper end 212a so as to move behind the tab 146 of the push rod 131 whenever the circuit breaker 201 is closed. It is apparent in FIGS. 5 and 10 that this obstructs resetting movement of the push rod 131, whereby the position stop means will hold the retractable inner unit 101 in its obtained position and the racking mechanism remains disabled. On the other hand, the bent over end 212a of the interlock link 212 is tilted out of the way of the tab 146 whenever the circuit breaker 201 is open, thereby enabling the position stop means to be reset and a racking operation to be undertaken.

In order to accomplish the second breaker interlock function referred to, the interlock link 214, which is guided by means of pin 216 located on the circuit breaker 201, is provided at its upper end with a laterally protruding pin 217 which rides along the top edge of the cam element 148 of the push rod 131. With the push rod 131 in its foremost position, as is shown in FIG. 5, the pin 217 is disposed immediately behind side 148b of the cam element, and as a result the link 214 is in a lowered position which enables the trip latch shaft 215 to assume its non-tripping angular position. The circuit breaker 201 can now be closed at will. Upon manipulating the reset knob 142 to reset the position stop means and render the racking mechanism operable, however, the push rod 131 is shifted rearwardly thereby causing the rear camming surface 148b of the element 148 to elevate pin 217, whereby the link 214 is lifted to actuate the trip latch shaft 215 of the circuit breaker 201. So long as the push rod 131 is in either its reset or its intermediate (FIG. 6) position, as it will be while a racking operation is being carried out, the tripping interlock link 214 will hold the trip latch shaft 215 in its FIG. 6 disposition, thereby preventing closure of the circuit-interrupting contacts of the breaker.

While a preferred form of the invention has been shown and described by way of illustration, many modifications will occur to those skilled in the art. We therefore contemplate by the claims which conclude this specification to cover all such modifications as fall within the true spirit and scope of our invention.

What we claim as new and desire to secure by United States Letters Patent is:

1. In switchgear apparatus: a relatively stationary enclosure unit including a pair of spaced sidewalls; a movable unit disposed between the sidewalls of said enclosure unit and adapted to support an electric circuit interrupter; and a racking mechanism for moving said movable unit relative to the enclosure unit between different predetermined positions, the racking mechanism comprising:
    (a) a pair of interengageable camming elements mounted on said enclosure and movable units, respectively, with one of the elements being so movable relative to the other that the coaction therebetween will drive said movable unit between its predetermined positions,
    (b) a ratchet wheel for moving said one element upon angular advancement of the wheel,
    (c) a ratchet operating pawl disposed adjacent to said wheel for advancing the wheel upon movement of the pawl in a predetermined direction,
    (d) means for biasing said pawl in a direction opposite to said predetermined direction,
    (e) a differential pulley system for moving said pawl in said predetermined direction, said differential system including
        (i) an output pulley connected to said pawl,
        (ii) a double pulley disposed for limited rotation about an axis which is fixed relative to the axis of said ratchet wheel, the double pulley having greater and lesser rims of different diameters, and
        (iii) a flexible cable attached at one end to said greater rim, looped tautly over the output pulley and wrapped around said lesser rim to which its other end is attached, whereby the output pulley moves said pawl in said predetermined direction in response to constriction of the cable loop upon rotation of the double pulley in a predetermined forward direction to unwind the cable wrapped around said lesser rim,
    (f) a driving pulley disposed adjacent to said double pulley for rotation about the same axis, said driving pulley being operatively coupled to the double pulley which is thereby rotated in said forward direction in response to rotation of the driving pulley in a corresponding direction,
    (g) coil spring means for normally biasing both said driving pulley and said double pulley in a reverse direction,
    (h) a manually operative handle, and
    (i) a flexible connecting member anchored to said handle and wrapped around said driving pulley for rotating the driving pulley in its forward direction, thereby moving said pawl and hence incrementally advancing said ratchet wheel, upon operation of the handle.

2. In switchgear apparatus: a relatively stationary enclosure unit including a pair of spaced sidewalls; a movable unit disposed between the sidewalls of said enclosure unit and adapted to support an electric circuit interrupter; and a racking mechanism for moving said movable unit relative to the enclosure unit between different predetermined positions, the racking mechanism comprising:
    (a) a pair of interengageable camming elements mounted on said enclosure and movable units, respectively, with one of the elements being so movable relative to the other that the coaction therebetween will drive said movable unit between its predetermined positions,
    (b) a differential pulley system for moving said one element, said differential system including
        (i) a double pulley disposed for rotation about an axis which is fixed relative to the unit on which said one element is mounted, said double pulley having greater and lesser rims of different diameters,
        (ii) an output pulley disposed in variably spaced relation to the double pulley, said output pulley being coupled to said one element to effect movement thereof as the output pulley moves toward the double pulley, and
        (iii) a flexible cable attached at one end to said greater rim, looped tautly over the output pulley and wrapped around said lesser rim to which its other end is attached, whereby the output pulley is moved toward the double pulley in response to rotation of the double pulley in a predetermined forward direction to unwind the cable wrapped around said lesser rim,
    (c) a driving pulley disposed adjacent to said double pulley for rotation about the same axis, said driving pulley being operatively coupled to the double pulley by means of a pin that protrudes laterally from one of the adjacent pulleys and extends into a cooperating opening in the other, whereby the double pulley can be rotated in its forward direction by the driving pulley when the driving pulley is rotated in a corresponding direction,
    (d) means for rotating said driving pulley, and
    (e) means connected to said output pulley for moving it away from the double pulley upon reverse rotation of the double pulley.

References Cited by the Examiner
UNITED STATES PATENTS
2,859,629   11/58   Parker et al. _____ 74—480

BERNARD A. GILHEANY, *Primary Examiner.*